(12) United States Patent
Teichmann et al.

(10) Patent No.: US 11,699,233 B2
(45) Date of Patent: Jul. 11, 2023

(54) DIGITAL PATHOLOGY USING AN ARTIFICIAL NEURAL NETWORK

(71) Applicant: Siemens Healthcare GmbH, Erlangen (DE)

(72) Inventors: Marvin Teichmann, Erlangen (DE); Andre Aichert, Erlangen (DE); Birgi Tamersoy, Erlangen (DE); Martin Kraus, Fuerth (DE); Arnaud Arindra Adiyoso, Nuremberg (DE); Tobias Heimann, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 17/705,887

(22) Filed: Mar. 28, 2022

(65) Prior Publication Data

US 2022/0319000 A1 Oct. 6, 2022

(30) Foreign Application Priority Data

Mar. 31, 2021 (DE) ............... 10 2021 203 251.6

(51) Int. Cl.
*G06T 7/00* (2017.01)
*G06V 10/82* (2022.01)
*G06T 7/11* (2017.01)
*G06V 10/774* (2022.01)
*G06V 20/69* (2022.01)

(52) U.S. Cl.
CPC ............ *G06T 7/0012* (2013.01); *G06T 7/11* (2017.01); *G06V 10/774* (2022.01); *G06V 10/82* (2022.01); *G06T 2207/10056* (2013.01); *G06T 2207/20081* (2013.01); *G06T 2207/20084* (2013.01); *G06T 2207/30024* (2013.01); *G06V 20/698* (2022.01)

(58) Field of Classification Search
CPC ............ G06T 7/0012; G06T 7/11; G06T 2207/10056; G06T 2207/30024; G06T 7/136; G06T 2207/20081; G06T 2207/20084; G06T 2207/30096; G06V 10/774; G06V 10/82; G06V 20/698; G16H 50/20; G16H 70/60; G06N 3/084
See application file for complete search history.

(56) References Cited

U.S. PATENT DOCUMENTS

| | | | |
|---|---|---|---|
| 2019/0311202 A1* | 10/2019 | Lee | G06T 9/002 |
| 2020/0066407 A1 | 2/2020 | Stumpe et al. | |
| 2022/0198671 A1* | 6/2022 | Price | G06T 7/11 |

FOREIGN PATENT DOCUMENTS

| | | |
|---|---|---|
| CN | 109886986 A | 6/2019 |
| CN | 110337644 A | 10/2019 |
| WO | WO-2022036086 A1 * | 2/2022 |

OTHER PUBLICATIONS

German Office Action and English translation thereof dated Nov. 23, 2021.

(Continued)

*Primary Examiner* — Jon Chang
(74) *Attorney, Agent, or Firm* — Harness, Dickey & Pierce, P.L.C.

(57) ABSTRACT

Various example embodiments pertain to processing images that depict tissue samples using a neural network algorithm. The neural network algorithm includes multiple encoder branches that are copies of each other that share the same parameters. The encoder branches can, accordingly, be referred to as Siamese copies of each other.

17 Claims, 4 Drawing Sheets

(56) References Cited

OTHER PUBLICATIONS

German Decision to Grant and English translation thereof dated Jun. 2, 2022.

Bertinetto L.:"Fully-convolutional Siamese networks for object tracking" in European conference on computer vision, pp. 850-865. Springer, 2016.

Fu Y. et al.:"Pan-cancer computational histopathology reveals mutations, tumor composition and prognosis". Nature Cancer, 1(8):800-810, 2020.

Nagpal K. et al.:"Development and validation of a deep learning algorithm for improving gleason scoring of prostate cancer" NPJ digital medicine, 2(1):1-10, 2019.

Kaiming He, Xiangyu Zhang, Shaoqing Ren, and Jian Sun. Deep residual learning for image recognition. CoRR, abs/1512.03385, 2015.

Ström P. et al.:"Pathologist-level grading of prostate biopsies with artificial intelligence" arXiv preprint arXiv:1907.01368, 2019.

Simonyan, Karen, and Zisserman, Andrew "Very Deep Convolutional Networks for Large-Scale Image Recognition" https://arxiv.org/abs/1409.1556v6 (2014); 2014.

Nazeri K. et al.:"Two-stage convolutional neural network for breast cancer histology image classification" in International Conference Image Analysis and Recognition, pp. 717-726. Springer, 2018.

Hou L. et al."Patch-based convolutional neural network for whole slide tissue image classification" in Proceedings of the ieee conference on computer vision and pattern recognition, pp. 2424-2433, 2016.

Tellez, David, et al. Neural Image Compression for Gigapixel Histopathology Image Analysis. arXiv preprint arXiv:1811.02840v2, 2020; 2020.

Mingxing Tan et al.:"Efficientnet: Rethinking model scaling for convolutional neural networks. arXiv preprint", arXiv:1905.11946, 2019.

Radosavovic I et al.:"Designing network design spaces". In Proceedings of the IEEE/CVF Conference on Computer Vision and Pattern Recognition, pp. 10428-10436, 2020.

Daudt R.C. et al.:"Fully convolutional Siamese networks for change detection" in 2018 25th IEEE International Conference on Image Processing (ICIP), pp. 4063-4067. IEEE, 2018.

Luo W et al.:"Understanding the effective receptive field in deep convolutional neural networks" in Advances in neural information processing systems, pp. 4898-4906, 2016.

* cited by examiner

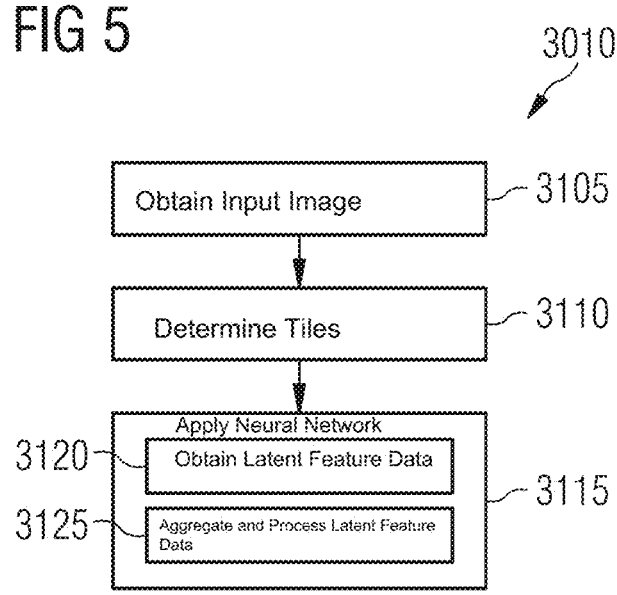
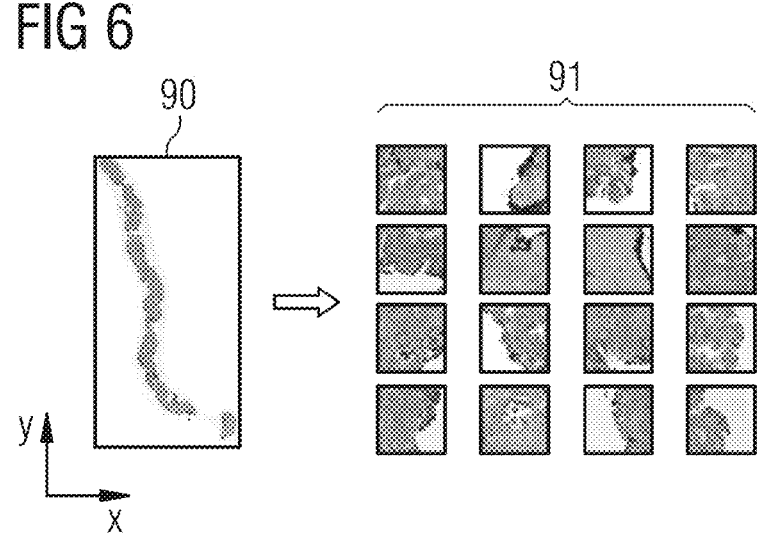

DIGITAL PATHOLOGY USING AN ARTIFICIAL NEURAL NETWORK

CROSS-REFERENCE TO RELATED APPLICATION(S)

The present application claims priority under 35 U.S.C. § 119 to German Patent Application No. 102021203251.6, filed Mar. 31, 2021, the entire contents of which are incorporated herein by reference.

FIELD

Various example embodiments generally relate to digital pathology using an artificial neural network. For example, an artificial neural network can be used that includes multiple encoder branches to process multiple tiles of an input image.

BACKGROUND

In histopathology, a tissue sample of a patient is inspected to study a manifestation of a disease such as cancer.

Conventionally, a practitioner can manually inspect the tissue samples using a microscope. It would also be possible that the practitioner inspects images depicting the tissue sample acquired using a digital microscope.

Recently, algorithmic analysis of tissue samples has become possible. This is referred to as digital pathology. Reference techniques of digital pathology use Convolutional Neural Networks (CNNs). Such techniques are described in: Karen Simonyan and Andrew Zisserman. Very deep convolutional networks for large-scale image recognition. arXiv preprint arXiv:1409.1556, 2014. Such techniques are further described in: Kaiming He, Xiangyu Zhang, Shaoqing Ren, and Jian Sun. Deep residual learning for image recognition. CoRR, abs/1512.03385, 2015. Such techniques are further described in: Mingxing Tan and Quoc V Le. Efficientnet: Rethinking model scaling for convolutional neural networks. arXiv preprint arXiv:1905.11946, 2019. Such techniques are further described in: Ilija Radosavovic, Raj Prateek Kosaraju, Ross Girshick, Kaiming He, and Piotr Dollar. Designing network design spaces. In Proceedings of the IEEE/CVF Conference on Computer Vision and Pattern Recognition, pages 10428-10436, 2020.

Oftentimes, digital pathology requires processing large images, e.g., Whole Slide Tissue Images (WSI) using a neural network algorithm (NN). A WSI depicts a microscopically magnified tissue sample of macroscopic scale, e.g., centimeters; thus, the WSI can include a many pixels. WSIs typically come at a size of tens of thousands of pixels in each dimension.

SUMMARY

It has been found that processing such large input images using an algorithm can be challenging.

Therefore, a need exists for advanced techniques of digital pathology. Specifically, a need exists for advanced techniques of processing input images of arbitrary size.

This need is met by the features of the independent claims. The features of the dependent claims define embodiments.

A computer-implemented method includes obtaining an input image. The input image depicts a scene. For example, the scene may be a tissue sample. Then, multiple tiles of the input image are determined. For each tile of the multiple tiles, the respective tiled is processed in a respective encoder branch of a neural network algorithm. Thereby, a respective latent feature data structure is obtained. Furthermore, a decoder branch of the neural network algorithm is used to aggregate the latent feature data structures of the multiple tiles, to obtain a merged latent feature data structure. Also, the merged latent feature data structure is processed to infer at least one semantic feature associated with the scene—e.g., at least one semantic histopathology feature—, using the decoder branch of the neural network algorithm. The multiple encoder branches processing the multiple tiles are copies of each other sharing the same parameters.

The method may further comprise, performing one or more of the following based on the at least one semantic histopathology feature: supporting a treatment decision of a clinician; performing a diagnosis of a pathology of the patient; generating a clinical report for the patient; suggesting one or more additional diagnostic actions for the patient.

A computer program or a computer-program product or a computer-readable storage medium includes program code. The program code can be loaded and executed by a processor. Upon loading and executing the program code, the processor performs a method. The method includes obtaining an input image. The input image depicts a scene. For example, the scene may be a tissue sample. Then, multiple tiles of the input image are determined. For each tile of the multiple tiles, the respective tiled is processed in a respective encoder branch of a neural network algorithm. Thereby, a respective latent feature data structure is obtained. Furthermore, a decoder branch of the neural network algorithm is used to aggregate the latent feature data structures of the multiple tiles, to obtain a merged latent feature data structure. Also, the merged latent feature data structure is processed to infer at least one semantic feature associated with the scene—e.g., at least one semantic histopathology feature—, using the decoder branch of the neural network algorithm. The multiple encoder branches processing the multiple tiles are copies of each other sharing the same parameters.

A device includes a processor. The processor is configured to obtain an input image. The input image depicts a scene such as a tissue sample. The processor is further configured to determine multiple tiles of the input image. For each tile of the multiple titles, the processor is configured to process the respective tile in a respective encoder branch of a neural network algorithm, to thereby obtain a respective latent feature data structure. The processor is further configured to use a decoder branch of the neural network algorithm to aggregate the latent feature data structures of the multiple tiles to obtain a merged latent feature data structure, as well as to process the merged latent feature data structure to infer at least one semantic feature, e.g., at least one semantic histopathology feature associated with the tissue sample. The multiple encoder branches processing the multiple tiles are copies of each other and share the same parameters.

A computer-implemented method includes obtaining a training input image. The training input image depicts a scene, e.g., a tissue sample. Furthermore, a ground-truth label for at least one semantic feature associated with the training input image is obtained. For example, at least one semantic histopathology feature can be obtained, if the training input image depicts a tissue sample. The method further includes determining multiple tiles of the training input image. Furthermore, the method includes performing an end-to-end training of a neural network algorithm based on the ground-truth label. The neural network algorithm includes multiple encoder branches and a decoder branch.

Each encoder branch processes a respective tile of the multiple tiles. The decoder branch processes a merged latent feature data structure that is obtained from aggregating latent feature data structures that are obtained from the encoder branches. The multiple encoder branches processing the multiple tiles are copies of each other that share the same parameters.

A computer program or a computer-program product or a computer-readable storage medium includes program code. The program code can be loaded and executed by a processor. Upon loading and executing the program code, the processor performs a method. The method includes obtaining a training input image. The training input image depicts a scene, e.g., a tissue sample. Furthermore, a ground-truth label for at least one semantic feature associated with the training input image is obtained. For example, at least one semantic histopathology feature can be obtained, if the training input image depicts a tissue sample. The method further includes determining multiple tiles of the training input image. Furthermore, the method includes performing an end-to-end training of a neural network algorithm based on the ground-truth label. The neural network algorithm includes multiple encoder branches and a decoder branch. Each encoder branch processes a respective tile of the multiple tiles. The decoder branch processes a merged latent feature data structure that is obtained from aggregating latent feature data structures that are obtained from the encoder branches. The multiple encoder branches processing the multiple tiles are copies of each other that share the same parameters.

A device includes a processor. The processor is configured to obtain a training input image. The training input image depicts a scene such as a tissue sample. The processor is further configured to obtain a ground-truth label for at least one semantic feature associated with the training input image, e.g., at least one semantic histopathology feature for the tissue sample. The processor is further configured to determine multiple tiles of the training input image. The processor is further configured to perform an end-to-end training of a neural network algorithm based on the ground-truth label. The neural network algorithm includes multiple encoder branches and a decoder branch. Each encoder branch processes a respective tile of the multiple tiles. The decoder branch processes a merged latent feature data structure that is obtained from aggregating latent feature data structures that are obtained from the encoder branches. The multiple encoder branches processing the multiple tiles are copies of each other that share the same parameters.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The characteristics, features and advantages of example embodiments described above will become clearer and easier to understand in conjunction with the following figures and their descriptions. In this case the figures and descriptions are not intended to restrict example embodiments and its forms in any way.

In different figures the same components are provided with corresponding reference characters. As a rule the figures are not true-to-scale.

FIG. 5 is a flowchart of a method according to various example embodiments.

FIG. 6 schematically illustrates multiple tiles determined based on an input image according to various example embodiments.

DETAILED DESCRIPTION

Figure 1:
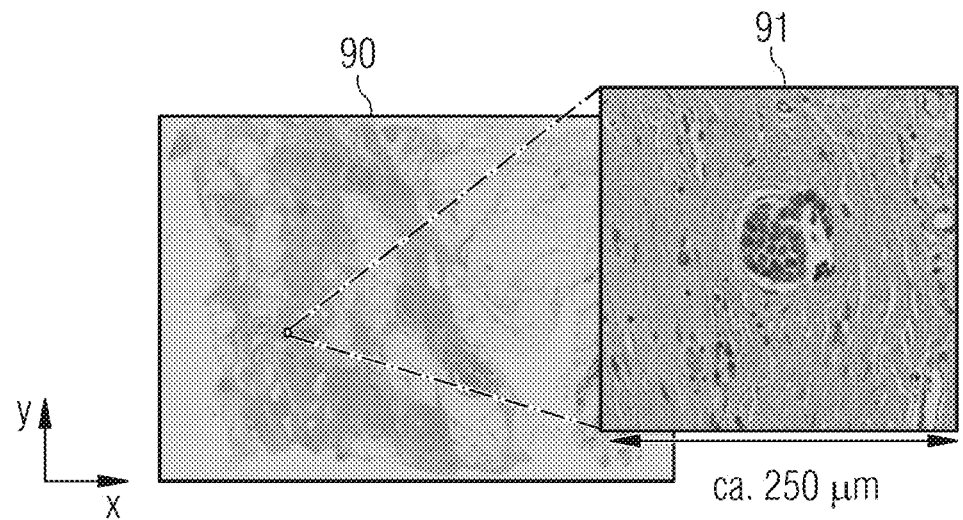
FIG. 1 schematically illustrates a WSI and a title of the WSI according to various example embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one example embodiment, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s)

as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, at least some example embodiments will be described in detail with reference to the accompanying drawings. It is to be understood that the following description of embodiments is not to be taken in a limiting sense. The scope of example embodiments is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of digital pathology are described. Input images depicting tissue samples can be processed using a machine-learning algorithm. An example machine-learning algorithm is a NN.

As a general rule, the NN includes multiple layers. The input to a first layer is the input image. Each layer can apply one or more mathematical operations on the input values, e.g., convolutions, nonlinear excitations, pooling operations, to give just a few examples. The input to a layer can be formed by the output of a preceding layer (feed-forward). Feedback of values or skip-connection skipping layers are possible.

The NN can infer at least one semantic histopathology feature. The at least onesemantic histopathology feature can describe whether the tissues sample is a manifestation of a disease. Thereby, a practitioner can be assisted in performing an analysis of the tissue sample.

The input image could have a size of at least 4.000×4.000 pixels, or at least 10.000×10.000 pixels, or at least 1E6×1E6 pixels. The input image could be a WSI. The input image could be acquired using optical microscopy.

Example semantic histopathology features that could be inferred by the NN can be selected from the group consisting of: Gleason scoring, cancer grading, cancer stage estimation, clinical pathway prediction, sub-tumor classification, metastasis evaluation, microsatellite instability (MSI) or stability.

For example, a cancer grading can be in accordance with a predefined grading system. Examples would include the Bloom-Richardson score or TNM classification of malignant tumors. Classification systems are available for brain tumors, breast tumors, prostate cancer (Gleason scoring), and other kind of tumors.

A metastasis describes the spread of cancer cells into other areas of the body. This can often be detected by analyzing a tissue sample that is acquired remote from the source cancer site.

The clinical pathway prediction could be indicative of one or more characteristics of a suggested future clinical treatment of the respective cancer. The clinical pathway prediction could include a mortality protection, a prediction for a duration of treatment.

The MSI is a condition of genetic hypermutability (predisposition to mutation) that results from impaired DNA mismatch repair. The presence of MSI represents phenotypic evidence that MMR is not functioning normally.

Various techniques are based on the finding that conventional CNNs—used in reference implementations for digital pathology—are sometimes unable to meaningfully process input images of higher resolution than a predefined threshold resolution due to their limited field of view. An example threshold resolution is 224×224 pixels.

There are reference techniques available to process large-sized input images. Such reference techniques employ a two-stage tiling approach. Here, the input image is split into multiple tiles of small size. The NN is then applied to each tile individually producing one prediction per tile. The predictions are then combined by a simpler model (e.g. logistic regression) based on the histogram of predictions.

Such reference techniques employing the two-stage tiling approach are described in: Kamyar Nazeri, Azad Aminpour, and Mehran Ebrahimi. Two-stage convolutional neural network for breast cancer histology image classification. In International Conference Image Analysis and Recognition, pages 717-726. Springer, 2018. Also, see: Yu Fu, Alexander W Jung, Ramon Viñas Torne, Santiago Gonzalez, Harald Vöhringer, Artem Shmatko, Lucy R Yates, Mercedes Jimenez-Linan, Luiza Moore, and Moritz Gerstung. Pan-cancer computational histopathology reveals mutations, tumor composition and prognosis. Nature Cancer, 1(8):800-810, 2020. Also, see: Le Hou, Dimitris Samaras, Tahsin M Kurc, Yi Gao, James E Davis, and Joel H Saltz. Patch-based convolutional neural network for whole slide tissue image classification. In Proceedings of the ieee conference on computer vision and pattern recognition, pages 2424-2433, 2016. Also, see: Kunal Nagpal, Davis Foote, Yun Liu, Po-Hsuan Cameron Chen, Ellery Wulczyn, Fraser Tan, Niels Olson, Jenny L Smith, Arash Mohtashamian, James H Wren, et al. Development and validation of a deep learning algorithm for improving gleason scoring of prostate cancer. NPJ digital medicine, 2(1):1-10, 2019. Also, see: Peter Strom, Kimmo Kartasalo, Henrik Olsson, Leslie Solorzano, Brett Delahunt, Daniel M Berney, David G Bostwick, Andrew J Evans, David J Grignon, Peter A Humphrey, et al. Pathologist-level grading of prostate biopsies with artificial intelligence. arXiv preprint arXiv:1907.01368, 2019.

To train the CNN most of the reference techniques require tile-level labels. Those annotations can be very time-consuming to obtain, due to the large amount of tiles and the associated effort for manual annotation. An exception to this is the method proposed by Hou et al., which uses an Expectation Maximization (EM) approach to identify tiles which contain the relevant information. This approach is however computationally very expensive. In addition, it risks that relevant tiles are discarded which potentially leads to a loss of information on therefore suboptimal prediction performance. In addition, most two-stage approaches according to reference techniques utilize auxiliary losses and apply a training pipeline which differs from the inference pipeline. This means that the task the network is trained for is not exactly the same as the task which it is supposed to solve. This can lead to suboptimal prediction performance.

According to examples disclosed herein, a NN is described which enables processing arbitrarily sized input images, e.g., WSIs. The NN can be trained to solve various pathology task which can be formulated as a classification or regression problem, i.e., determine various semantic histopathology features as discussed above. A one-stage tiling approach is employed, in contrast to the two-stage tiling approach according to reference techniques.

According to examples described herein, multiple tiles can be processed in parallel by the NN to produce a joined prediction based on the features of all processed tiles. The NN is end-to-end trainable, does not require auxiliary annotation—i.e., does not require annotation for each tile—and is able to efficiently combine information from several regions of the slide.

Next, such techniques are explained in further detail.

Upon obtaining an input image depicting a tissue sample (e.g., the input image may be loaded from a memory or received from a microscope), preprocessing is applied on the input image.

Here, multiple tiles of the input image are determined. A selection process can be used. The selection process may include randomization and/or thresholding. The input image may be randomly split into k tiles. Each tile may have a predefined size, e.g., a size 256×256 pixels. The tiles may be drawn without replacement such that each selected tile contains sufficiently enough tissue area. It would be possible to apply thresholding on the contrast values of the input image and only select tiles from areas of the input image having contrast values above a respective predefined threshold.

Then, the NN receives the tiles as input. The NN can include an encoder-decoder architecture. Encoder branches are tasked with processing each of the k tiles. For each tile, a respective encoder branch produces a latent feature data structure such as a feature vector which contains information about the features found in the respective tile. Those latent data structures are then merged by a decoder branch whose purpose it is to produce a joined prediction of the semantic histopathology feature based on the k feature vectors produced by the encoder branches.

The encoder branches can include convolutional layers. As a general rule, any CNN backbone like resnet (see He et al.) or efficientnet (see Tan et al.) or a custom design can be used.

The weights of the encoder branches may be shared between the encoder branches, enabling efficient learning and processing of each layer of the network. This means that the multiple encoder branches processing the multiple tiles can share the same parameters. i.e., the same weights can be used for all encoder branches. This can be enforced during the training, by changing the weights in a shared manner.

Sometimes, a concept of sharing parameters between multiple encoder branches is referred to as Siamese copies. See Luca Bertinetto, Jack Valmadre, Joao F Henriques, Andrea Vedaldi, and Philip H S Torr. Fully-convolutional siamese networks for object tracking. In European conference on computer vision, pages 850-865. Springer, 2016; also see [12] Rodrigo Caye Daudt, Bertr Le Saux, and Alexandre Boulch. Fully convolutional siamese networks for change detection. In 2018 25th IEEE International Conference on Image Processing (ICIP), pages 4063-4067. IEEE, 2018. These reference implementations of Siamese copies of encoder branches are applied to other tasks, e.g., processing two images—such as a predefined image and an acquired image—and the output of those networks are compared towards the goal of tracking changes. These reference implementations of Siamese networks are in contrast to the techniques disclosed herein according to which the latent feature data structures of the encoder branches are aggregated to obtain the merged latent feature data structure, to produce a joined prediction of the one or more semantic histopathology features.

As a general rule, the decoder branch can include one or more of the following layers to implement said aggregating of the latent data structures of the multiple tiles: an averaging layer, a max-pooling layer, a 1-D convolution layer, a fully-connected layer, or a layer implementing a matrix product with a weight kernel.

For instance, the decoder branch could be implemented by an average or max pooling of all k feature vectors, followed by one or more fully-connected layers. Alternatively the merging of the feature vectors can be learned using a 1D-convolution, a fully connected layer or a matrix product with a weight kernel.

It has been observed to be advantageous to use a merging which is agnostic to the amount of tiles selected. This allows processing more tiles during inference then training.

According to various examples disclosed herein, the inferred at least one histopathology feature can be used in various use cases. For instance, it would be possible to implement a decision-support functionality. Here, the at least one semantic histopathology feature can be used in order to support decision-making of a clinician or a practitioner. For instance, a suggestion could be made regarding a suggested treatment of the patient. The suggested treatment could be helpful to favorably affect the clinical pathway of the patient.

Alternatively or additionally, in a further use case, it would be possible to perform a diagnosis of a pathology of the patient based on the at least one semantic histopathology feature.

Alternatively or additionally, in yet a further use case, it would be possible to generate a clinical report based on the at least one histopathology feature that has been inferred. The clinical report can be generated based on one or more templates that defines the framework of the clinical report. The templates can then be adjusted in order to include details of a diagnosis based on the at least one histopathology feature.

Alternatively or additionally, and yet a further use case, it would be possible to perform a "rule-in" test. Here, additional diagnostic actions—e.g., genomic-based tumor analysis—could be selectively recommended based on the at least one semantic histopathology feature. FIG. 1 schematically illustrates an input image that can be input to a NN according to various examples. The input image 90 is a WSI. For instance, the dimension of the input image 90 could be tens of thousands of pixels in each one of the X dimension and the Y dimension.

The input sample depicts a tissue sample. The tissue sample could be obtained from a biopsy; a small slice can be prepared and placed on a fixative such as formalin. Then, the input image 90 can be acquired.

Also illustrated is a tile 91 that covers a part of the input image. For instance, the tile 91 can have a predefined size, e.g., not larger than 0.5% of the pixels in each of the X dimension and the Y dimension if compared to the input image 90.

Figure 2:
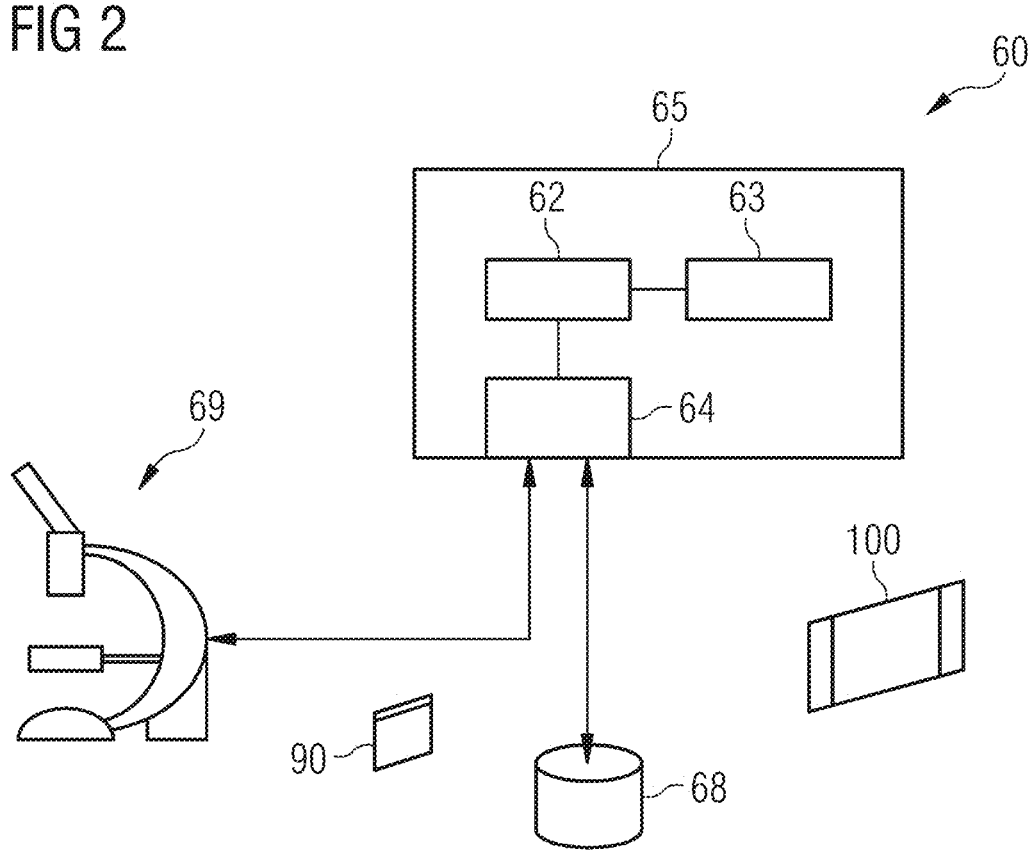
FIG. 2 schematically illustrates a system according to various example embodiments.

FIG. 2 schematically illustrates a system 60 according to various examples. The system 60 includes a microscope 69 that can provide the input image 90. The input image 90 can be provided to a device 65 of the system 60. The device 65 can include a processor 62 in the memory 63. The device 65 can receive the input image 90 via an interface 64, e.g., from the microscope 69 or from a database 68 such as a picture archiving system (PACS).

The processor 62 can load and execute program code from the memory 63. Upon loading and executing the program code, the processor 62 can perform techniques as described herein such as: performing digital pathology using a NN 100; training the NN 100; obtaining input images 90, e.g., via the interface 64 from the microscope 69 or from the database 68; applying the NN to the input images 90 to infer one or more semantic histopathology features, e.g., MSI, cancer grading, clinical pathway prediction, Gleason scoring and others.

Figure 3:
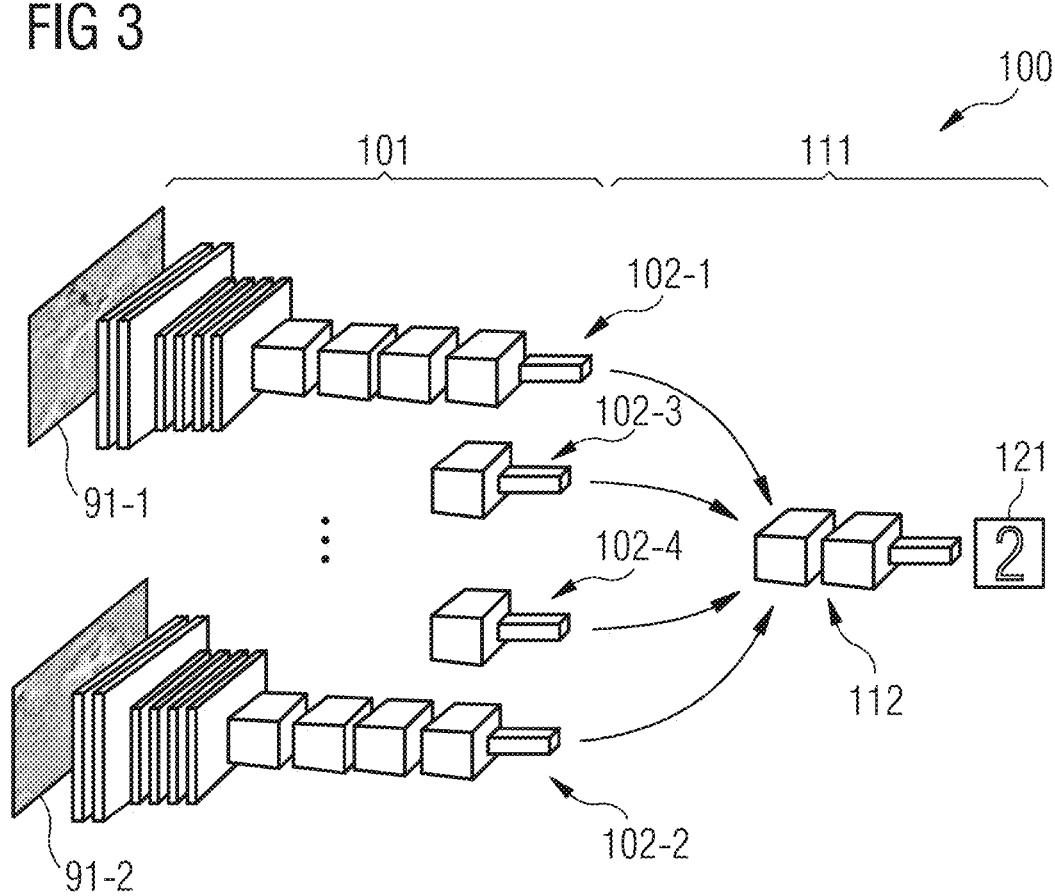
FIG. 3 schematically illustrates a NN according to various example embodiments.

FIG. 3 schematically illustrates aspects with respect to the NN 100. The NN 100 includes multiple encoder branches 101.

The multiple encoder branches 101 each include multiple layers. They encode the input, i.e., reduce the dimensionality of the respective data structures. The encoder branches 101 process multiple tiles 91-1-91-2 of an input image 90 that depicts a tissue sample. Thereby, for each encoder branch, a respective latent feature data structure 102-1-102-4 is obtained. In the illustrated examples 2-D vectors are obtained.

These latent feature data structures 102-1-102-4 are then processed by a decoder branch 111, to obtain a merged latent feature data structure 112—here, a 3-D matrix—that incorporates information from all latent feature data structures 102-1-102-4.

By means of further processing in the decoder branch 111, the merged latent feature data structure 112 is used to infer one or more semantic histopathology features 121 associated with the tissue sample.

The aggregation of the latent feature data structures 102-1-102-4 can be implemented by averaging, max-pooling etc. Example techniques have been described above.

According to examples, it is possible that the multiple encoder branches 101 are copies of each other that share the same parameters, i.e., Siamese copies.

Figure 4:
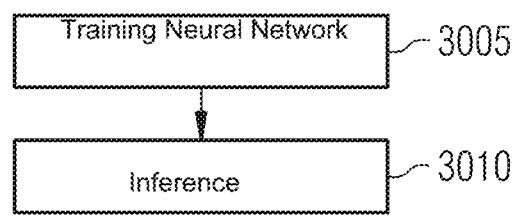
FIG. 4 is a flowchart of a method according to various example embodiments.

FIG. 4 is a flowchart of a method according to various examples. The method of FIG. 4 could be executed by a device such as the device 65. More specifically, the method of FIG. 4 could be executed by the processor 62 upon loading respective program code from the memory 63.

At box 3005, a training of the NN for predicting one or more semantic histopathology features associated with the tissue sample based on an input image of the tissue sample is performed. For example, the NN 100 can be trained.

As a general rule, the training is based on a training input image that depicts a tissue sample. A training input image used during training can be similar to the input image used during inference (cf. FIG. 1, input image 90). The same imaging modality and the same configuration of the imaging modality can be used.

Then, a ground-truth label for a semantic histopathology feature is obtained. The ground-truth label can be obtained for the training input image as a whole. A single ground-truth label can be sufficient.

Specifically, it is not required to obtain ground-truth labels for multiple tiles (as would be required in some reference implementations).

It is then possible to perform an end-to-end training of the NN based on the ground-truth label and the training input image. Specifically, end-to-end training denotes a process in which multiple encoder branches and the decoder branch are jointly trained. I.e., weights are jointly adjusted for the multiple encoder branches and the decoder branch based on a single loss value.

Specifically, a loss function can be defined which compares an output of the NN, i.e., an inferred semantic histopathology feature, with the ground-truth label. Depending on a deviation between the ground-truth label and the prediction, the loss value can be determined using the loss function. Based on the loss value, it is possible to adjust weights of the NN.

Specifically, it would be possible to adjust weights of multiple encoder branches, wherein the weights of the multiple encoder branches are adjusted in the same manner such that the multiple encoder branches are Siamese copies of each other.

The training can implement an iterative optimization process; a Gradiant-descent scheme can be used for adjusting the weights. Backgpropagation can be used. Specifically, the above-described process can be repeated for multiple iterations until the loss value is minimized by the respective weights. Per iteration, the weights of both the encoder branches, as well as the decoder branch can be jointly adjusted to implement the end-to-end training. This enables the encoder branches learning features that can provide meaningful prediction of the semantic histopathology feature. the features learned by the encoder branches are not required to be predefined.

Furthermore, to increase the accuracy of the training, it would be possible to use multiple training input images depicting one or more tissue samples in using a respective number of ground-truth labels.

Once there NN has been trained, at box 3010 inference can take place. During inference, ground-truth labels are not available. The semantic histopathology feature can be predicted.

Details with respect to the inference of box 3010 will be explained below in connection with FIG. 5.

FIG. 5 is a flowchart of a method according to various examples. The method of FIG. 5 illustrates aspects with respect to inference of a semantic histopathology feature associated with a tissue sample using an NN. FIG. 5 can, accordingly, implement box 3010 of the method according to FIG. 4.

At box 3105, an input image depicting the tissue sample is obtained. The input image may be obtained from a microscope. The input image may be loaded from a database.

At box 3110, multiple tiles of the input image are determined. Each tile is smaller in size than the original input image. It would be possible that the multiple tiles cover an area fraction of the input image which is in the range of 0.5% to 20%. I.e., only a subfraction of the total input image may be covered by the tiles.

The multiple tiles could be determined using a selection process. The selection process could include randomization of positions of the multiple tiles. Alternatively or additionally, thresholding could be used.

Details with respect to the determining of the multiple tiles are illustrated in connection with FIG. 6, as well as FIG. 7.

FIG. 6 illustrates the input image 90 and, furthermore, illustrates multiple tiles 91. In the illustrated example, a number of 12 tiles is selected. This is only an example.

Thresholding can be applied to ensure that the tiles depict tissue. As illustrated in FIG. 6, certain areas of the input image 90 do not depict tissue sample (white contrast in FIG. 6). By comparing the contrast of the pixels of the input image with a predefined contrast threshold, it would be possible to segment an area of the input image depicting tissue.

Figure 7:
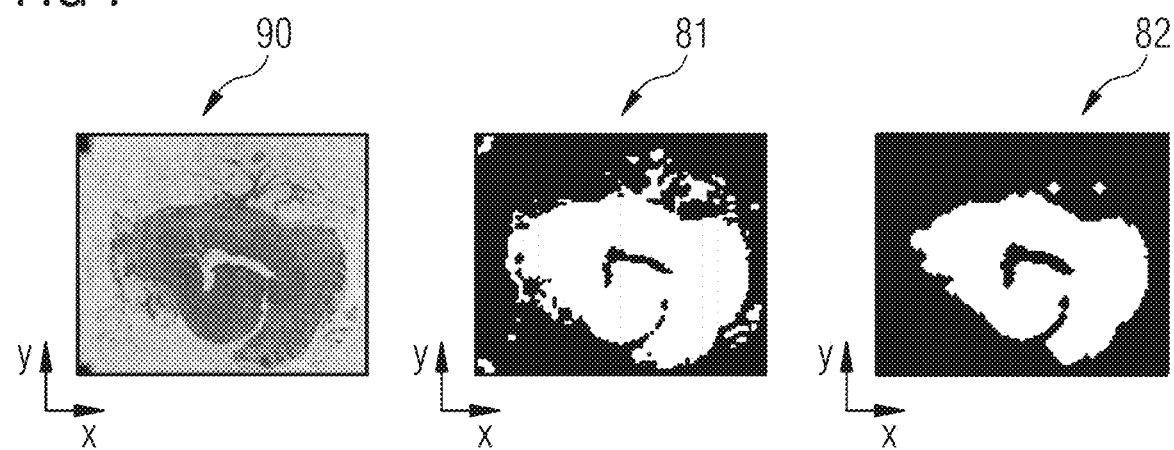
FIG. 7 schematically illustrates thresholding applied to an input image prior to determining multiple tiles according to various example embodiments.

This is also illustrated in further detail in FIG. 7. In FIG. 7, left, the input image 90 is illustrated. Then, a threshold is applied to the pixel values illustrating a segmentation 81 indicating areas of the input image 90 in which the tissue sample is present. The segmentation 81 can be subject to an erosion process to obtain an eroded segmentation 82. Then, the tiles can be selected within the eroded segmentation 82 only.

Referring again to FIG. 5: once the tiles have been determined in box 3110, the NN 100 is applied in box 3115. This includes, for each one of the multiple tiles, processing the respective tile in a respective encoder branch of the NN, to obtain a respective latent feature data structure (cf. FIG. 3: encoder branches 101 and latent feature data structures 102-1-102-4), box 3120. Then, the latent feature data structures can be aggregated and processed using a decoder branch (cf. FIG. 3: decoder branch 111), box 3125. In detail, it would be possible to aggregate the latent feature data structures to obtain a merged latent feature data structure and process the merged latent feature data structure to infer the semantic histopathology feature. A single NN is used in box 3115, i.e., a NN which is trained end-to-end.

As a general rule, various options are available to computationally implement the multiple encoder branches at box 3120. For instance, multiple respective software objects may be instantiated, i.e., one object for each encoder branch. It would also be possible that a single software object is instantiated that implements each encoder branch. Then, using, e.g., a Graphics Processor Unit that is capable of parallel processing, it would be possible to use hardware-accelerated parallel processing based on a single instantiated software object, sometimes called "batch"-processing. For instance, multiple tiles can be aggregated in a 3D object and the 3D object can be processed in a single forward pass by the multiple encoder branches, than instantiated as a single software object.

Figure 8:
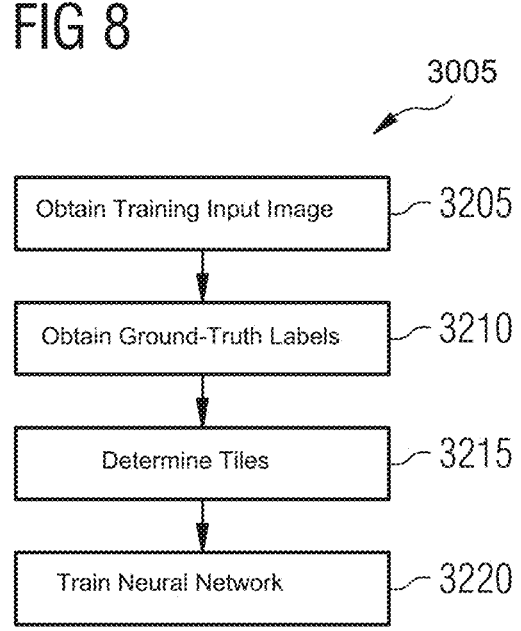
FIG. 8 is a flowchart of a method according to various example embodiments.

FIG. 8 is a flowchart of a method according to various examples. The method of FIG. 8 illustrates aspects with respect to training of a NN that can infer a semantic histopathology feature associated with a tissue sample. The method of FIG. 8 can be used to train the NN used in FIG. 5. The method of FIG. 8 could be used to train the NN 100 that has been discussed above in connection with FIG. 3. FIG. 8 can, accordingly, implement box 3005 of the method according to FIG. 4.

At box 3205, a training input image is obtained. The training input image is obtained from a microscope or from an imaging database. The training input image depicts a tissue sample. Box 3205 can correspond to box 3105.

Then, at box 3210, a ground-truth labels obtained for the training input image. Specifically, the ground-truth labels can indicate a semantic histopathology feature associated with the tissue sample. Manual annotation would be possible.

Then, at box 3215, multiple tiles are determined for the training input image. Box 3215 can be implemented using the same selection process also used for box 3112 of the method of FIG. 5.

As will be appreciated, the ground-truth labels determined at box 3210 does not need to be determined individually for each tile. This has the advantage of significantly reduced complexity of the annotation process.

Then, at box 3220, the training can be performed. This is based on the ground-truth label, as well as the training input image.

Specifically, an end-to-end training of the NN can be performed. This means that weights of the multiple encoder branches, as well as weights of the decoder brands are jointly adjusted based on a loss value determined by a loss function based on a comparison between the road detected semantic histopathology feature associated with the tissue sample obtained as an output from the NN in its current training state and the ground-truth label.

This end-to-end training facilitates machine-learning selection of the features described by the latent feature data structures output by the encoder branches. It is not required to explicitly specify these features during supervised training. Thereby, more accurate inference is enables, because the features recognized by the encoder branches can be tailored to the specific digital-pathology task.

As mentioned above, the weights of the multiple encoder branches can be jointly adjusted in the same manner, so that the multiple encoder branches are copies of each other that share the same parameters (Siamese copies).

Summarizing, techniques of digital pathology have been described. A NN is used. The entire training and prediction pipeline can be integrated into a single NN. This is in contrast to reference techniques that rely on a two-stage pipeline.

By having a single NN, the NN can be trained end-to-end which allows the encoder branches to produce latent feature vectors describing features which are particularly suitable for the joined prediction task.

Compared to many two-stage approaches according to reference implementations, the techniques disclosed herein are computationally efficient. During inference, only one forward pass of our network is required to obtain a good prediction. On modern hardware this can be done in less than 100 ms, making the approach suitable for real-time applications.

Lastly the feature vectors produced by the encoder branches can be learned implicitly. Most two-stage approaches according to reference implementations require explicit task-specific labels as ground-truth associated with each tiles. Obtaining those can be very time-consuming and error prone.

Although at least some example embodiments have been shown and described with respect to certain preferred embodiments, equivalents and modifications will occur to others skilled in the art upon the reading and understanding of the specification. Example embodiments include all such equivalents and modifications and is limited only by the scope of the appended claims.

For illustration, above, various techniques have been described according to which the input image depicts a tissue sample and, accordingly, a semantic histopathology feature associated with the tissue sample is inferred. However, as a general rule, it would be possible to use the techniques described herein also in other use cases. I.e., images may be used that depict other types of scenes, different than a tissue sample. Then, other semantic information may be inferred. For example, the techniques described herein could be applied to use cases in the field of remote sensing, e.g., based on satellite images. For instance, certain global properties of respective satellite imaging data—e.g., populated area, unpopulated area, vegetation, etc.—may be inferred, as respective semantic features.

The invention claimed is:

1. A computer-implemented method, comprising:
    obtaining an input mage, the input image depicting a tissue sample;
    determining multiple tiles of the input image;
    processing each tile of the multiple tiles in a respective encoder branch of a neural network algorithm, to obtain a respective latent feature data structure; and
    using a decoder branch of the neural network algorithm, the using including,
        aggregating the latent feature data structures of the multiple tiles, to obtain a merged latent feature data structure, and
        processing the merged latent feature data structure to infer at least one semantic histopathology feature associated with the tissue sample,
    wherein the multiple encoder branches processing the multiple tiles share the same parameters.

2. A computer-implemented method, comprising:
    obtaining a training input image, the training input image depicting a tissue sample;
    obtaining a ground-truth label for at least one semantic histopathology feature associated with the training input image;
    determining multiple tiles of the training input image; and
    performing an end-to-end training of a neural network algorithm based on the ground-truth label, the neural network algorithm comprising multiple encoder branches and a decoder branch, each encoder branch processing a respective tile of the multiple tiles, the decoder branch processing a merged latent feature data structure obtained from aggregating latent feature data structures obtained from the multiple encoder branches,
    wherein the multiple encoder branches share the same parameters.

3. The computer-implemented method of claim 1,
    wherein the multiple encoder branches comprise convolutional layers.

4. The computer-implemented method of claim 1,
    wherein the multiple tiles of the input image are determined using a selection process, and
    the selection process comprises at least one of randomization of positions of the multiple tiles or thresholding of a contrast of the multiple tiles.

5. The computer-implemented method of claim 1,
    wherein the at least one semantic histopathology feature is selected from a group consisting of: a Gleason score, cancer grading, cancer stage estimation, clinical pathway prediction, sub-tumor classification, metastasis evaluation, and microsatellite instability or stability.

6. The computer-implemented method of claim 1,
    wherein the decoder branch comprises at least one of
        an averaging layer,
        a max-pooling layer,
        a 1-D convolution layer,
        a fully-connected layer, or
        a layer implementing a matrix product with a weight kernel.

7. The method of claim 1,
    wherein the merged latent feature data structure is processed using a fully connected layer of the decoder branch.

8. The method of claim 1,
    wherein the multiple tiles cover an area fraction of the input image, the area fraction being in a range of 0.5% to 20%.

9. A device comprising:
    at least one processor configured to,
        obtain an input image, the input image depicting a tissue sample,
        determine multiple tiles of the input image,
        process each tile of the multiple tiles in a respective encoder branch of a neural network algorithm, to obtain a respective latent feature data structure, and
        use a decoder branch of the neural network algorithm to,
            aggregate the latent feature data structures of the multiple tiles to obtain a merged latent feature data structure, and
            process the merged latent feature data structure to infer at least one semantic histopathology feature associated with the tissue sample,
    wherein the multiple encoder branches share the same parameters.

10. A device comprising:
    at least one processor configured to,
        obtain a training input image, the training input image depicting a tissue sample,
        obtain a ground-truth label for at least one semantic histopathology feature associated with the training input image,
        determine multiple tiles of the training input image,
        perform an end-to-end training of a neural network algorithm based on the ground-truth label, the neural network algorithm comprising multiple encoder branches and a decoder branch, each encoder branch configured to process a respective tile of the multiple tiles, the decoder branch configured to process a merged latent feature data structure obtained from aggregating latent feature data structures obtained from the multiple encoder branches, wherein the multiple encoder branches share the same parameters.

11. The computer-implemented method of claim 2,
    wherein the multiple encoder branches comprise convolutional layers.

12. The computer-implemented method of claim 2,
    wherein the multiple tiles of the training input image are determined using a selection process, and
    the selection process comprises at least one of randomization of positions of the multiple tiles or thresholding of a contrast of the multiple tiles.

13. The computer-implemented method of claim 2, wherein the at least one semantic histopathology feature is selected from a group consisting of: a Gleason score, cancer grading, cancer stage estimation, clinical pathway prediction, sub-tumor classification, metastasis evaluation, and microsatellite instability or stability.

14. The device of claim 9, wherein the multiple encoder branches comprise convolutional layers.

15. The device of claim 9, wherein the decoder branch comprises at least one of
    an averaging layer,
    a max-pooling layer,
    a 1-D convolution layer,
    a fully-connected layer, or
    a layer implementing a matrix product with a weight kernel.

16. The device of claim 10, wherein the multiple encoder branches comprise convolutional lavers.

17. The device of claim 10, wherein the decoder branch comprises at least one of
    an averaging layer,
    a max-pooling layer,
    a 1-D convolution layer,
    a fully-connected layer, or
    a layer implementing a matrix product with a weight kernel.

\* \* \* \* \*